United States Patent Office 3,359,232
Patented Dec. 19, 1967

3,359,232
POLYOXYMETHYLENE STABILIZED WITH
TRIMETHYLENE THIOUREA
Irving Rosen, Painesville, Ohio, assignor to Diamond
Alkali Company, Cleveland, Ohio, a corporation of
Delaware
No Drawing. Filed Nov. 16, 1964, Ser. No. 411,578
8 Claims. (Cl. 260—45.8)

This invention relates to thermally-stable thermoplastic compositions of matter. More particularly, it relates to oxymethylene polymers and to the method for improving their initial thermal stability.

Oxymethylene polymers have become, in recent years, well known in the art, being prepared by polymerizing under substantially anhydrous conditions either formaldehyde or trioxane or by polymerizing other oligomers of formaldehyde. These polymers are thermoplastic materials of varying molecular weight composed of repeating oxymethylene —$CH_2O$— units joined together in linear chains which may be terminated at one or at both ends by thermally unstable hydroxyl groups, depending upon the method of preparation. Accordingly, these polymers will be degraded or decomposed to varying degrees when exposed to elevated processing temperatures.

Several methods are presently employed to reduce degradation of oxymethylene polymers in processing, i.e., to improve their stability upon exposure to elevated temperatures. These methods primarily involve "capping" of the chain-end groups of the polymer and/or by introduction of different and more thermally stable units into the polymeric chain by copolymerization.

I have now found that the thermal stability of such oxymethylene polymers is still further improved by the incorporation therein of a cyclic substituted thiourea, specifically trimethylene thiourea.

As used herein in the specification and claims, the term "oxymethylene polymer" is intended to refer to oxymethylene homopolymers prepared from formaldehyde or from trioxane, which polymers have been stabilized after preparation by chemical treatment, particularly by etherification of their chain end-groups. It is likewise intended to refer to those oxymethylene copolymers which contain from 85 to 99.9 mol percent of recurring oxymethylene groups in combination with from 0.1 up to about 15 mol percent of oxyalkylene groups of two or more carbon atoms, which groups are derived from a cyclic ether monomer. Additionally, the term "oxymethylene polymer" is also intended to refer to novel oxymethylene copolymers containing from 90 to 99.9 mol percent of recurring oxymethylene groups interspersed with from 0.1 up to 10 mol percent of recurring groups derived from norbornadiene monomer, which copolymers will be hereinafter described. At present, the thermal stability of the copolymer materials is particularly improved by the process of this invention. For this reason, specific reference will be made hereinafter to these copolymers. Such reference is not to be taken, however, as limiting the present invention but merely as being illustrative thereof.

In general, the present invention involves intimately mixing with an oxymethylene polymer, as previously defined, from about 0.01 up to 1 percent by weight of trimethylene thiourea. The treated polymer subsequently shows a significantly improved thermal stability by comparison with the untreated polymer. Additionally, when tested under similar conditions, the treated polymer of this invention is more thermally stable than polymers similarly treated with compounds known heretofore as stabilizers, especially cyclic substituted thioureas other than trimethylene thiourea.

Oxymethylene homopolymers stabilized by the process of this invention are, as described earlier, known materials prepared from formaldehyde or from trioxane or other formaldehyde oligomers by processes described in numerous U.S. and foreign patents. The oxymethylene copolymers stabilized in this invention are those prepared from mixtures containing monomers as hereinafter described preferably in combination with trioxane as the oxymethylene source, the said reactant mixtures being copolymerized in the presence of cationic-type initiators known in the art, e.g., a coordinate complex of a metal halide such as boron trifluoride with an organic compound in which oxygen or sulfur is the donor atom.

It has been reported that degradation of oxymethylene polymers in air at elevated temperatures may be caused by (1) oxidative attack on the hydrogen atoms in the polymeric chain by oxygen or by free radicals having oxidative activity; (2) by hydrolytic attack of oxygen in the polymeric chain by hydrogen ion or its equivalent; and/or (3) by degradation initiated at the ends of the polymer chain which causes monomer units to successively break away from the polymer chain ends until a stable monomer unit is reached. With degradation, the polymer usually develops a disagreeable formaldehyde odor and oftentimes unwanted color. Most important, cleavage or scission of the polymer chain which oftentimes occurs with degradation deleteriously affects the toughness and strength properties of the polymer.

It is believed that the stabilizing efficiency of trimethylene thiourea herein is due to its ability to act principally as a scavenger compound for destroying within the polymer the above-described free oxidative radicals and compounds effecting hydrolytic attack. However, it is also possible that trimethylene thiourea may act in other ways to help stabilize the polymer.

The compositions of this invention are most conveniently prepared by dissolving the trimethylene thiourea in a volatile solvent therefor and then adding to the polymer an amount of the prepared stabilizer solution sufficient to incorporate therein up to about 1 percent of the stabilizer, by weight. Thorough mixing of the polymer and stabilizer is accomplished preferably with agitation. Thereafter, the solvent may be removed conveniently by evaporation. Typical, suitable solvents for the trimethylene thiourea are lower alkanoic alcohols, e.g., methanol or ethanol, acetone, benzene and low-boiling aliphatic hydrocarbons.

Alternatively, the trimethylene thiourea may be incorporated by dry blending the polymer and stabilizer together or else by dissolving both the polymer and the stabilizer in a common solvent such as dimethyl formamide with subsequent evaporation of the solvent.

Generally, the trimethylene thiourea is admixed with the oxymethylene polymer in an amount not exceeding 1 percent, based on the weight of the polymer. However, an amount of trimethylene thiourea within the range of 0.05 to 0.50 percent, by weight of the polymer, generally has been found satisfactory and is preferred.

The stabilizing efficiency of trimethylene thiourea is determined by first weighing a sample of the treated oxymethylene polymer, then heating it for 30 minutes in an air-circulating oven maintained at 220° C., cooling and again weighing the treated polymer and determining the percentage of original polymer remaining, i.e., the percent stable polymer. As will be shown hereinafter by specific examples, the stabilized polymers of this invention are from 90 to 98 percent stable and usually remain colorless when tested as described, whereas oxymethylene polymers similarly stabilized with like quantities of other known stabilizing compounds are typically less stable and oftentimes develop color.

Additionally, the effectiveness of trimethylene thiourea in retarding chain scission or cleavage in the polymer at elevated temperatures is established by comparing the average molecular weight of the treated polymer before and after oven exposure. Also, the molecular weight of the heat-exposed stabilized polymer is compared with similar values obtained for heat-exposed polymers containing other stabilizers. The inherent viscosity values of these polymers are employed herein to indicate their molecular weight and are determined at 60° C., employing a 0.5 percent solution of each polymer in p-chlorophenol containing 2 percent of alpha-pinene, by weight.

It is found that the inherent viscosity of the stabilized polymers of this invention is insignificantly reduced by heat treatment. Accordingly, the stabilized compositions of this invention undergo minimum degradation of the polymer chain upon heating and substantially retain their excellent physical properties.

In the practice of this invention, trimethylene thiourea generally is completely effective when employed as the sole stabilizing compound in the polymer. However, it also may be used in combination with other known stabilizing compounds, such as alkylene bisphenols, cyclic amines, etc., without departing from the intended scope of this invention.

The stabilized compositions of this invention may be processed into articles such as moldings, films, sheets, rods, tubes, fibers, filaments and the like by conventional molding, casting and/or extrusion operations currently practiced. In processing, these compositions may also include plasticizers, fillers, pigments, processing aids and the like which are oftentimes employed when processing thermoplastic materials.

In order that those skilled in the art may more completely understand the present invention and the preferred methods by which the same may be carried into effect, the following specific examples are offered. In these examples and elsewhere herein, parts and percentages are by weight unless otherwise specified.

EXAMPLE 1

A trioxane-norbornadiene copolymer is prepared essentially as described in my copending application, U.S. Ser. No. 346,099, filed Feb. 20, 1964, as follows.

A 100-ml., round-bottom flask equipped with an agitator, a thermometer, a rubber serum cap and with nitrogen inlet and outlet tubes is heated in an oil bath at 60° C. and is flushed with nitrogen. Forty-nine and three-tenths g. of trioxane, 15 g. of cyclohexane, 1.5 g. of norbornadiene and 0.03 g. of boron trifluoride dibutyl etherate are then charged to the flask with agitation. Under a slight positive nitrogen pressure, the resulting mixture is reacted at 60° C. for 1⅓ hours. It is then cooled and discharged from the flask. The solid product mass is isolated by filtration and is pulverized by grinding in a Waring Blendor containing acetone. The pulverulent copolymer is purified by leaching with acetone and is finally dried under vacuum at 50° C. The finished copolymer is found by elemental analysis to contain 0.6 mol percent of norbornadiene and has an inherent viscosity of 1.08.

To three different 1-gram portions of this copolymer is added a sufficient quantity of a 1% solution of trimethylene thiourea in methanol to incorporate into the copolymer 0.10, 0.08 and 0.05 percent of the stabilizer, respectively. To additional 1-gram samples of the polymer are added small amounts of other stabilizers as listed in the table below. After thorough mixing, the polymer-stabilizer solution slurries are allowed to stand until all of the methanol is evaporated and the treated polymers maintain constant weight.

The treated polymer samples are heated in an air-circulating oven at 220° C. for 30 minutes. They are then removed from the oven, cooled and reweighed and the percentage of stable polymer remaining calculated. The inherent viscosity of each oven-exposed sample is determined at 60° C., employing a 0.5% solution of the polymer in p-chlorophenol, containing 2% alpha-pinene, by weight. Results are as follows:

TABLE I

| Stabilizer | Percent Stabilizer | Percent Stable Copolymer After Exposure at 220° C./30 min. | Inherent Viscosity of Heat-treated Polymer |
|---|---|---|---|
| None | | 23 | (*) |
| Trimethylene Thiourea | 0.10 | 96 | 0.95 |
| Do | 0.08 | 95 | 0.95 |
| Do | 0.05 | 94 | 0.94 |
| Dimethylene Thiourea | 0.50 | 74 | |
| Dimethylene Thiourea | 0.50 } | 93 | 0.72 |
| Dicyandiamide | 0.10 } | | |
| Dimethylene Thiourea | 0.25 } | 91 | 0.64 |
| Dicyandiamide | 0.10 } | | |
| Tetramethylene Thiourea | 0.50 | 94 | 0.88 |
| Do | 0.25 | 93 | 0.83 |
| Do | 0.10 | 10 | |

*Inherent viscosity of unheated polymer = 1.08.

As the above data indicate, trimethylene thiourea, even when incorporated in a copolymer in much smaller quantities than are the other stabilizer or stabilizer combinations, more effectively stabilizes the copolymer and retards chain scission or cleavage. During the heat treatment, the copolymer samples containing trimethylene thiourea remain white, while those with the other stabilizing materials turn tan to brown in color, depending upon the amount of stabilizer incorporated.

EXAMPLE 2

Following the procedure as outlined in Example 1, a 1-gram portion of a copolymer having 98.5 mol percent of units derived from trioxane and 1.5 mol percent of units derived from 1,3-dioxolane is blended with 0.50 percent of trimethylene thiourea. Similarly, other portions of the copolymer are admixed with other stabilizing compounds as shown below.

The treated copolymer samples are heated at 220° C. for 30 minutes and the stability and inherent viscosity of each heat-exposed sample is determined as described in Example 1. Results are as follows:

TABLE II

| Stabilizer | Percent Stabilizer | Percent Stable Copolymer After Exposure at 220° C./30 min. | Inherent Viscosity of Heat-treated Polymer |
|---|---|---|---|
| None | | 5 | (¹) |
| Trimethylene thiourea | 0.50 | 98 | 1.26 |
| Dimethylene thiourea | 0.75 | 92 | 0.99 |
| Cyanamide 2246 ² | 0.75 | 79 | 0.74 |

¹ Inherent viscosity of unheated polymer = 1.28.
² 2,2'-methylene bis(4-methyl-6-tert-butylphenol).

During the heat exposure period, copolymer samples treated with both trimethylene and dimethylene thiourea remain white, while the sample containing Cyanamide 2246 develops a light brown color.

EXAMPLE 3

Employing the apparatus as described in Example 1, a trioxane-norbornadiene copolymer is prepared in the absence of an organic liquid reaction medium. This copolymer is prepared by reacting 35.2 g. of trioxane, 1.07 g. of norbornadiene and 0.01 g. of boron trifluoride dibutyl etherate for 1 hour at 105° C. The copolymer contains 0.5 mol percent of units derived from norbornadiene and has an inherent viscosity of 0.87.

Following the previously described procedure, separate portions of this copolymer are each mixed with a stabilizer shown in the following table and then heated, after which the viscosity and the stable portion of each exposed copolymer sample is determined. Results are as follows:

TABLE III

| Stabilizer | Percent Stabilizer | Percent Stable Copolymer After Exposure at 220° C./30 min. | Inherent Viscosity of Heat-treated Polymer |
|---|---|---|---|
| None | | 68 | 0.31 |
| Trimethylene Thiourea | 0.75 | 99 | 0.80 |
| Do | 0.50 | 97 | 0.79 |
| Trimethylene Thiourea | 0.50 | 97 | 0.80 |
| Dicyandiamide | 0.10 | | |
| Phenylurea | 0.75 | 58 | |
| Butyl Thiourea | 0.75 | 70 | 0.48 |
| Urea | 0.75 | 73 | |
| Dimethylene Thiourea | 0.75 | 91 | 0.67 |

EXAMPLE 4

This example illustrates the greater stabilizing effectiveness of trimethylene thiourea by comparison to certain other known stabilizing compounds. The stabilizers are incorporated into a trioxane-norbornadiene copolymer having an inherent viscosity of 0.77 and containing 0.4 mol percent of units derived from norbornadiene. After stabilization, the copolymer samples are subjected to the heat treatment as previously described. Results are as follows:

TABLE IV

| Stabilizer | Percent Stabilizer | Percent Stable Copolymer After Exposure at 220° C./30 min. |
|---|---|---|
| None | | 23 |
| Trimethylene Thiourea | 0.50 | 92 |
| Dinitrobenzene | 0.75 | 65 |
| Dimethyl urea | 0.75 | 58 |
| Thioacetamide | 0.75 | 23 |
| Polyurethane | 0.75 | 26 |
| Benzoquinone | 0.50 | 81 |
| Hydroquinone | 0.50 | 68 |
| Mercaptobenzothiazole | 0.75 | 39 |

The inherent viscosity of the heat-exposed sample containing trimethylene thiourea is 0.76, indicating that negligible chain scission of the copolymer occurs during the heat exposure period.

EXAMPLE 5

Following the method described in U.S. Patent 2,512,950 issued on June 27, 1950, a polyoxymethylene dihydrate is treated with methanol in the presence of sulfuric acid to replace the hydrogen atoms in the terminal hydroxyl groups with methyl groups. This polymer has an inherent viscosity of 1.0.

The etherified polymer is admixed as previously described with 0.5 percent by weight of trimethylene thiourea. A weighed portion of the treated polymer exposed in air at 220° C. for 30 minutes remains more than 90 percent stable whereas only 30 percent of the untreated polymer is recovered after similar oven exposure. The inherent viscosity of the treated polymer is 0.92.

EXAMPLE 6

To illustrate the excellent physical properties of a stabilized composition of this invention, a trioxane-norbornadiene copolymer is prepared as previously described. This copolymer contains 1.5 mol percent of units derived from norbornadiene and has an inherent viscosity of 1.17. It is blended with 0.5 percent by weight, of trimethylene thiourea and is then injection molded into test specimens for physical testing. Additional specimen moldings are similarly prepared from a commercial oxymethylene homopolymer and from a copolymer, which materials are reported to be end-group esterified and to contain stabilizing additives, respectively. Physical properties of the prepared specimen moldings are determined according to standard American Society for Testing Materials procedures and are as follows:

TABLE V

| Property | Trioxane Copolymer | Delrin [1] | Celcon [2] |
|---|---|---|---|
| Tensile strength, p.s.i. (ASTM 638-61) | 8,700 | 10,000 | 8,800 |
| Flexural strength, p.s.i. | 15,000 | 14,100 | 13,000 |
| Flexural modulus, p.s.i. (ASTM D 790-59T) | 445,000 | 415,000 | 375,000 |
| Hardness, Rockwell M (ASTM D 785-62) | 85 | 94 | 80 |

[1] Formaldehyde homopolymer.
[2] Trioxane-cyclic ether copolymer.

It is to be understood that although the invention has been described with specific reference to particular embodiments thereof, it is not to be so limited, since changes and alterations therein may be made which are within the full intended scope of this invention as defined by the appended claims.

What is claimed is:

1. A stabilized polymer composition comprising a normally solid, easily processed oxymethylene polymer having recurring oxymethylene groups and a stabilizing amount of trimethylene thiourea.

2. The polymer composition of claim 1 in which the said trimethylene thiourea is present in an amount ranging between 0.01 to 1 percent, by weight of the polymer.

3. The polymer composition of claim 1 in which the said trimethylene thiourea is present in an amount ranging between 0.05 to 0.50 percent, by weight of the polymer.

4. A stabilized polymer composition comprising a normally solid, easily processed oxymethylene polymer and from 0.01 to 1 percent, by weight of the polymer, of trimethylene thiourea, said oxymethylene polymer containing from 90 to 99.9 mol percent of recurring oxymethylene groups interspersed with from 0.1 up to 10 mol percent of recurring groups derived from norbornadiene.

5. The polymer composition of claim 4 which contains, by weight of the polymer, from 0.05 to 0.50 percent of trimethylene thiourea.

6. A stabilized polymer composition comprising a normally solid, easily processed oxymethylene polymer and from 0.01 to 1 percent, by weight of the polymer, of trimethylene thiourea, said oxymethylene polymer containing from 85 to 99.9 mol percent of recurring oxymethylene groups interspersed with 0.1 to 15 mol percent of recurring oxyalkylene groups of at least 2 carbon atoms, which oxyalkylene groups are derived from a cyclic ether.

7. The polymer composition of claim 6 in which the oxyalkylene groups are derived from 1,3-dioxolane.

8. A stabilized polymer composition comprising a normally solid polyoxymethylene ether and from 0.01 to 1 percent by weight of the polymer, of trimethylene thiourea, the said polyoxymethylene ether having an inherent viscosity of at least 1.0, as determined at 60° C. employing a 0.5 percent solution of the said polymer in p-chlorophenol containing 2 percent of alpha-pinene, by weight.

References Cited

UNITED STATES PATENTS

| | | | |
|---|---|---|---|
| 2,893,972 | 7/1959 | Kuhico | 260—45.9 |
| 3,124,543 | 3/1964 | Fowler et al. | 260—45.8 |
| 3,166,530 | 1/1965 | Equchi et al. | 260—45.9 |
| 3,252,940 | 5/1966 | Mantell | 260—45.9 |
| 3,317,477 | 5/1967 | Wilson et al. | 260—45.9 |

DONALD E. CZAJA, *Primary Examiner.*

H. E. TAYLOR, *Assistant Examiner.*